United States Patent [19]

Boncoeur et al.

[11] Patent Number: 4,675,205
[45] Date of Patent: Jun. 23, 1987

[54] SURFACE TREATMENT OF A PART AND USE OF THIS TREATMENT FOR IMPROVING THE ADHESION OF A COATING WHICH IS THEN DEPOSITED ON THE PART, PARTICULARLY BY HOT SPRAYING

[75] Inventors: Marcel Boncoeur, Paris; Bernard Hansz, Vert le Petit, both of France

[73] Assignee: Commissariat A L'Energie Atomique, Paris, France

[21] Appl. No.: 787,914

[22] PCT Filed: Mar. 8, 1985

[86] PCT No.: PCT/FR85/00047
§ 371 Date: Oct. 30, 1985
§ 102(e) Date: Oct. 30, 1985

[87] PCT Pub. No.: WO85/04121
PCT Pub. Date: Sep. 26, 1985

[30] Foreign Application Priority Data

Mar. 12, 1984 [FR] France ................... 84 03749

Mar. 12, 1984 [FR] France ................... 84 03750

[51] Int. Cl.⁴ ............................................. B05D 3/06
[52] U.S. Cl. ................................... 427/37; 219/76.16; 219/121 PY; 219/121 PL; 427/38; 427/316; 427/374.1; 427/398.3; 427/422
[58] Field of Search ................... 427/37, 38, 316, 422, 427/398.3, 374.1; 219/76.16, 121 PY, 121 PL Primary Examiner—Bernard D. Pianalto
Attorney, Agent, or Firm—Oblon, Fisher, Spivak, McClelland & Maier

[57] ABSTRACT

A process for the surface treatment of a part wherein it comprises subjecting the surface of said part in an inert atmosphere to the action of a hot gaseous arc plasma, and followed by the immediate cooling of the thus treated surface by projecting on to the same a cooling liquid at a temperature close to its saturation point which is a temperature whose variation from the saturation temperature does not exceed 15° C.

23 Claims, 4 Drawing Figures

SURFACE TREATMENT OF A PART AND USE OF THIS TREATMENT FOR IMPROVING THE ADHESION OF A COATING WHICH IS THEN DEPOSITED ON THE PART, PARTICULARLY BY HOT SPRAYING

BACKGROUND OF THE INVENTION

The present invention relates to a process for the treatment of the surface of a part, e.g. made from a heat sensitive material, such as a composite material, more particularly usable as a preliminary stage for the activation of a surface of a part coated with a material such as a ceramic material.

More specifically, it relates to carrying out a surface treatment of a part to be coated, in order to increase the adhesion of the coated material then sprayed on to the part and it is more particularly applicable to producing parts made from a composite material coated with a refractory material.

Over the last few years new composite materials have been developed and particularly those constituted by plastic substances reinforced by inorganic fibres, such as glass, carbon, silica or graphite fibres. However, the use of these materials has caused certain problems when they are to be provided with an adhesive covering, e.g. made from a ceramic material.

Thus, in the case of composite materials based on a plastic substance reinforced with inorganic fibres, the anchoring points of the covering are particularly constituted by microcracks formed in the resin at the fibres and this does not make it possible to obtain a good adhesion between the composite material and the covering material coating.

SUMMARY OF THE INVENTION

The present invention relates to a process for the surface treatment of a heat sensitive material part, e.g. of a composite material, which makes it possible to modify the surface state of the part, with a view to then forming an adhesive covering thereon.

The inventive process for the surface treatment of a heat sensitive material part comprises subjecting the surface of said part to the action of a plasma of a hot gaseous arc in an inert atmosphere and then cooling the thus treated surface by spraying on to it a cooling liquid, which is at a temperature close to its saturation temperature.

Generally, the gas of the plasma is nitrogen, argon, hydrogen, helium or a mixture thereof, accompanied sometimes by the introduction of traces of reactive gases (water, $BCl_3$, etc.) in order to accelerate the formation of active sites.

For carrying out the surface treatment, it is possible to use a plasma gun of a conventional type, e.g. comprising an anode essentially shaped like a hollow cylinder, a cathode arranged substantially concentrically to the anode and means for supplying a gas or gaseous mixture to the space between the anode and the cathode, in order to produce a plasma jet there.

By subjecting the surface of the part to a hot gaseous plasma, the latter is heated under the effect of infrared radiation and it is also cleaned by bombarding with high-energy ions, which makes it possible to tear away or remove on the one hand the gaseous atoms firmly absorbed on the surface of the part, whilst on the other hand producing active sites with a view to the attachment of the covering. Moreover, the ultraviolet radiation of the gaseous plasma makes it possible to bring about a final crosslinking of the material forming the part, when the latter is a plastics material. When the part is made from a composite material and has a matrix of a plastics material reinforced by inorganic fibres, it is assumed that there is an activation of the carbon atoms of the plastics material matrix flush with the surface of the part.

For carrying out the surface treatment by means of a gaseous plasma, the part is generally placed in a tight enclosure scavenged by an inert gas, such as argon and then a gaseous plasma is directed on to the part using a plasma gun. The supply intensity of the plasma arc is generally 400 to 800 A and the gas constituted e.g. by a mixture of argon and nitrogen is introduced into the gun under a pressure of 0.1 to 0.2 MPa. In general, the gun is moved along the surface of the part, in order to treat the totality thereof and several treatment cycles can be carried out, if necessary.

Simultaneously, the treated surface undergoes strong cooling, which can be carried out by spraying on to the part a cooling liquid at a temperature close to its saturation temperature. It is generally constituted by a liquefied gas, such as nitrogen or argon. The saturation temperature of a liquid is defined as being the temperature at which the vapour contained in solution in the liquid is given off. The saturation temperature is generally close to the boiling temperature, but differs therefrom, particularly in the case of liquefied gases.

Preferably, the cooling liquid is sprayed in droplet form. In order to produce such a mist on the part, it is advantageous to use at least one carrier gas for spraying the cooling liquid. In this case, the flow and pressure of the cooling liquid and carrier gas are regulated, so that the liquid droplets have a diameter equal to or less than 40 microns. Moreover, it can prove necessary to operate under a controlled atmosphere.

According to an embodiment of the invention, especially adapted to the preparation of a part to be coated by the hot spraying of a coating material, on the surface of the part to be coated is firstly deposited a thermoplastic material layer. In this case, coating is carried out by then hot spraying the coating material on to the surface of the part provided with said layer and the thus treated surface part is then immediately cooled.

Advantageously the surface cooling of the part on to which the coating material has been sprayed is carried out by utilizing the aforementioned cooling methods.

Preferably, the thermoplastic material layer deposited on the surface of the part undergoes the gaseous arc plasma treatment described hereinbefore by then immediately cooling the surface of the thus treated layer by spraying on to the same a cooling liquid which is at a temperature close to its saturation point.

This gaseous arc plasma treatment can be carried out under the same conditions as hereinbefore, and it makes it possible to obtain a better adhesion of the coating then deposited on the part. Moreover, it makes it possible to dry the layer of thermoplastic material and thus eliminate any trace of solvent.

Due to the placing of the thermoplastic material layer on the part to be coated, a high adhesion of the coating material is obtained. Thus, during the hot spraying of said material, the thermoplastic material softens and the particles of the ocating material are inserted into the thermoplastic material layer, which makes it possible to obtain a good anchoring of the coating. Moreover, said thermoplastic material layer has good ageing characteristics and does not deteriorate on contact with steam or under the action of radiation such as ultraviolet, infrared and similar radiation.

Generally, in order to permit a good anchoring of the coating material, the thermoplastic material layer deposited on the part has a thickness of 20 to 500 $\mu$m. Generally, hot spraying takes place in a controlled atmosphere, e.g. under an argon atmosphere. The presence of this controlled atmosphere during deposition and the fast cooling of the coated part makes it possible to prevent any burning of the thermoplastic material underlayer.

According to the invention, the thermoplastic material used is chosen so as to have a good compatibility, on the one hand with the material constituting the part, and on the other hand with the coating material, whilst also having an adequate thermal stability for withstanding the temperature used during the hot spraying of the coating material.

Examples of thermoplastic materials can be used are polystyrenes, polycarbonates, polyethers and polyolefins, such as polyethylene. The material constituting the part to be coated can be a composite material, a plastic material, wood, a metal, an alloy or a ceramic material. Generally, the parts to be coated aremade from a composite material, e.g. constituted by a plastic material reinforced with inorganic fibres, such as glass, carbon, silica or graphite fibres. The part can also be made from a composite material formed from the same inorganic fibres.

The process according to the invention is particularly applicable to the production of parts coated with metallic materials and/or refractory materials such as oxides, e.g. chromium oxide or alumina, carbides, nitrides, e.g. silicon nitride, e.g. silicon nitrides, silicides and borides.

In general, the thermoplastic material layer is deposited on the surface of the part by projecting on to the same a solution of the thermoplastic material in a solvent and then subjecting the thus deposited layer to a drying operation in order to eliminate the solvent. This drying operation can be performed at ambient temperature and is generally followed by stoving, in vacuo at a temperature below 100° C., in order to eliminate solvent traces which might be trapped in the deposited thermoplastic material layer.

Preferably, according to the invention, the part firstly undergoes a cleaning treatment prior to carrying out the surface treatment by means of the gaseous plasma and/or the deposition of the thermoplastic material layer.

This cleaning treatment can comprise scouring and/or sandblasting. The scouring treatment can be carried out by using organic solvents, such as alcohols, e.g. isopropanol. This treatment makes it possible to remove, on the one hand the greases which may have been deposited on the surface of the part during the manipulations thereof, whilst on the other hand removing the dust which has accumulated and which e.g. results from the machining operations.

The sandblasting treatment is carried out by projecting abrasive particles on to the surface of the part. In general, use is made of particles having dimensions of 125 to 250 $\mu$m and formed e.g. by corundum and the particles are blasted under a pressure of 0.2 to 0.3 MPa.

This treatment makes it possible to produce a surface roughness advantageous for the attachment of a covering. Moreover, when the part is made from a plastics material reinforced by inorganic fibres, sandblasting leads to the removal of the plastics material covering the fibre, which is advantageous, because, in this area, the fibres have a preponderant function in the adhesion of the covering. However, sandblasting must not be carried out under excessively severe conditions, because these would lead to a breaking of the fibres and to a deterioration of the part.

Generally, following the scouring operations, the part is stoved in order to eliminate solvents, such as alcohol, used for scouring, as well as the water retained in the pores of the part. This stoving treatment can be performed at a temperature of 50° to 70° C. under a primary vacuum namely at a pressure below 266.66 Pa for approximately 2 to 12 h.

Following the stoving operation, if necessary, sandblasting can be carried out.

According to a preferred embodiment of the process according to the invention, the pretreatment includes a first microsandblasting stage followed by three washing stages, respectively performed with soft water, then acetone, then isopropanol and a final stage consisting of stoving.

Microsandblasting performed under relatively gentle conditions leads to a slight etching of the surface of the part and to a microcracking of the resin matrix, when the part is made from a plastic material reinforced with organic fibres.

The soft water washing operation leads to the removal of ions such as $Na^+$, $F^-$, etc. liable to prejudice the adhesion of the thermoplastic material layer. It also makes it possible to remove dust deposited on the part and the small fibres torn away from the strands in the case of parts made from fibre-reinforced material.

Acetone washing makes it possible to eliminate the water, and thus prevent a possible hydrolysis of the thermoplastic material. In addition, acetone solubilizes the organic impurities present on the surface of the part.

Washing with isopropanol completes the scouring and makes it possible to prevent acetone from remaining in the pores of the part, which in the long term could lead to an attack of the resin matrix, when the part is made from a fibre-reinforced resin.

Stoving makes it possible to remove the isopropanol and water retained in the pores of the part.

The process according to the invention is more particularly applicable to the treatment of composite material parts, more particularly formed from a plastic material reinforced by inorganic fibres, such as glass, carbon, silica and graphite fibres. As an example of such materials, reference can be made to composite materials based on epoxy resin reinforced by glass fibres. However, this process can also apply to the treatment of parts made from pure plastic materials, or even metallic parts.

The parts treated by the process according to the invention can then be coated with an appropriate material, e.g. a layer of a ceramic material or metal. In this case, there is firstly a surface treatment of the part using the process according to the invention, followed by the immediate spraying on to the surface of the part of the ceramic or metallic material, e.g. using a plasma gun and the aforementioned cooling system.

The ceramic materials which can be used are refractory compounds, such as oxides, carbides, nitrides, and silicides. The metallic materials are aluminium, tungsten, nickel, etc.

The coated parts obtained by the process according to the invention can be used in various fields which more particularly depend on the nature of the coating material and the material constituting the part. Thus, the process according to the invention can in particular be applied to the production of electric contacts, thermal protections, machining wheels, friction members, brush collectors or electric household goods and axles, e.g. made from a composite material coated with chromium oxide.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

A description will be firstly given of the performance of the surface treatment by gaseous arc plasma in accordance with the invention relative to epoxy resin parts reinforced with glass fibres and the coating of the thus treated parts with boron carbide.

The parts firstly undergo a scouring treatment with isopropanol. For this purpose, the parts are wetted with isopropanol and then rubbed by means of a nylon hairbrush, so as to remove the dust from the grooves. This is followed by isopropanol rinsing.

The scoured part then undergoes stoving at 50° C., for 10 hours and under a vacuum of approximately 13.33 Pa.

It then undergoes microsandblasting using corundum particles with a grain size of 200 $\mu$m and which are blasted on to the part under a pressure of 0.25 MPa. On weighing the parts before and after this micro-sandblasting operation, a very slight weight loss is noted.

Figure 1:
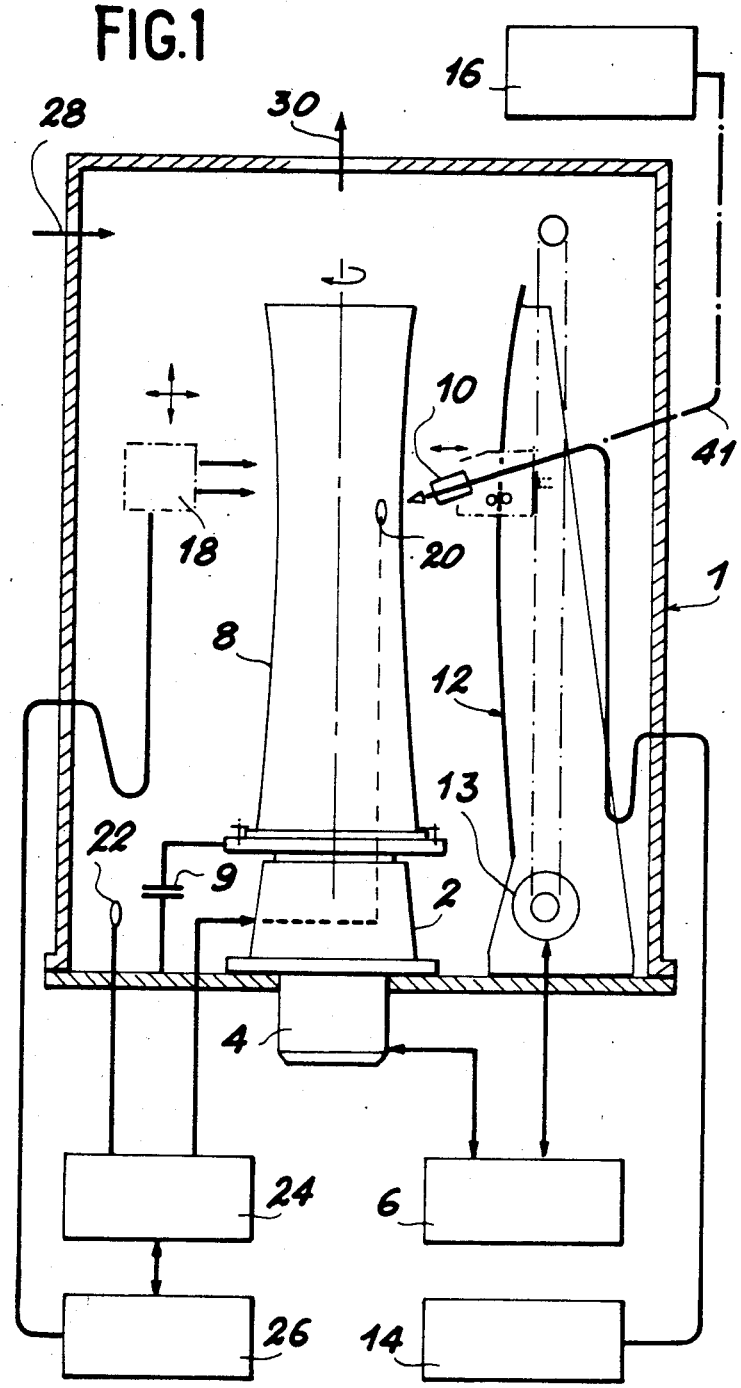
FIG. 1 diagrammatically and in a vertical section, an installation for performing the process according to the invention.

The part is then placed in a glove box, which is scavenged with nitrogen in order to carry out the surface treatment by means of the gaseous arc plasma, which can be carried out in the installation of FIG. 1.

FIG. 1 shows that this installation essentially comprises a tight enclosure 1 within which the part 8 to be treated rests on a support 2, which is rotatable about a vertical axis by means of a motor 4. In the special case described here, the part 8 to be treated has a symmetry of revolution and is positioned on support 2 in such a way that its axis of symmetry coincides with the rotation axis of said support. Plasma spraying is carried out by means of a gun 10, which moves along a track 12 by means of a drive mechanism 13.

A synchronization device 6 placed outside the enclosure 1 controls both the movements of gun 10 and of motor 4, so that the combination of the rotation of part 8 around its axis and the displacements of the gun along track 12 enables the entire surface of part 8 to be treated. Gun 10 is connected to a plasma control console 14. As will be shown hereinafter, it can also be connected to a powder distributor 16 by a pipe 41, so that it can also be used for producing a covering on the part, which has undergone the surface treatment according to the invention.

Console 10 makes it possible to control the arrival on the gun of the gases necessary for obtaining the plasma, i.e. in the particular case described here, the argon and nitrogen, as well as the water necessary for the cooling thereof. The gun 10 and the powder distributor 16 will be described in greater detail with reference to FIGS. 2 and 4.

FIG. 1 also shows the cooling system 18 used for cooling part 8 in the area in which the surface treatment or spraying will take place. This system is located at the same height as gun 10 relative to part 8 and also moves along said part by means of the synchronization device 6. The cooling system 18 will be described in greater detail hereinafter with reference to FIG. 3.

In order to regulate in an optimum manner the operating parameters of the cooling system 18 and the state of the atmosphere prevailing in enclosure 1, a certain number of heat sensors are provided in order to give details of the temperature of part 8 and of the atmosphere prevailing in the enclosure. The drawing diagrammatically shows a sensor 20 within the part and a sensor 22 in an enclosure 1 connected to a checking device 24, which makes it possible to act on the operating parameters of system 18 by means of a control device 26.

Furthermore, in order to regulate the composition of the atmosphere prevailing in enclosure 1, the latter is scavenged by means of a neutral gas, e.g. argon, whilst a calibrated flap valve makes it possible to discharge the gases contained in the enclosure, if the pressure exceeds a predetermined value. The introduction of the scavenging gas into the enclosure is symbolized by arrow 20 and the extraction of the gas in the case of an overpressure by arrow 30. The composition of the gas contained in the enclosure is constantly analyzed and the scavenging conditions are adjusted as a function of the analytical result. Thus, the spraying of the plasma and the cooling of part 8 by system 18 introduced into enclosure 1 gases which must be discharged. For this reason, the pressure and composition of the atmosphere prevailing therein are constantly checked, in order to regulate the scavenging flow rate on the basis thereof. Scavenging may even be stopped if the composition remains within the standards laid down and if the pressure remains below the predetermined limit value.

Thus, through checking the atmosphere prevailing in the enclosure, it is possible to use parts made from very chemically active materials, because the operation takes place under a neutral atmosphere, whilst the cooling with liquefied gas droplets permits a very effective cooling and consequently the use of materials which are unstable beyond a relatively low temperature of approximately 100° C. Thus, the use of a cryogenic liquid, e.g. a liquefied gas such as helium, nitrogen or argon, makes it possible to maintain the temperature of the part at a value below 50° C.

Due to the fact that the production of a plasma jet leads to the formation of a very intense electromagetic field in enclosure 1, all the equipment within the same are protected by connecting them to earth by capacitors. FIG. 1 shows capacitor 9 connecting support 2 to the metal earth constituted by the inner wall of enclosure 1, whilst all the other components, particularly gun 10 and cooling system 18, are also protected by capacitors.

Optionally, it is possible to provide a rotary passage in support 2 for the passage of the wires necessary for the operation of the different equipments. It is also possible to provide observation shield windows, but they must be impermeable to ultraviolet rays. Sound insulation can be provided to eliminate the significant noise caused by the formation of the plasma jet.

Figure 2:
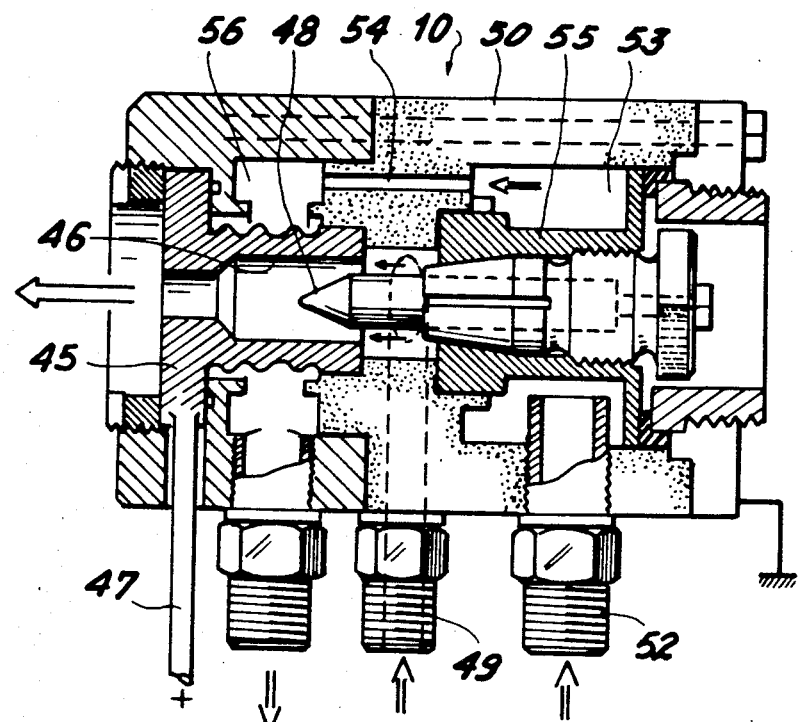
FIG. 2 a diagrammatic view in section of the plasma gun used in the installation of FIG. 1.

The plasma gun 10 can be best seen in the sectional view of FIG. 2. It can be seen that it essentially comprises an anode 45 connected to a not shown power supply by a wire 47. This anode has a symmetry of revolution and is essentially shaped like a hollow cylinder. A passage 46 is provided essentially along the axis of symmetry of said anode and cathode 48 is located within said space. The anode and the cathode are surrounded by an outer envelope 50 having the shape and dimensions such that a passage is provided for the cooling water between the anode and cathode on the one hand and the outer envelope on the other. It is also possible to see the coupling 49, to which leads the pipe supplying the gaseous mixture necessary for forming the plasma. In the special embodiment described here, the cathode is made from tungsten and the anode 45 of copper internally covered with rhenium in space 46. The rhenium coating ensuring the thermal protection of the anode.

In view of the large amount of heat given off as a result of the electrical discharge between the anode and the cathode for producing the plasma, a strong cooling of the gun is necessary. For this purpose, there is a water circulation and the water enters the gun through a coupling 52 and firstly circulates in a chamber 53 surrounding the cathode support 55, then in a pipe 54 and subsequently enters a chamber 56 surrounding the anode. The latter must be sufficiently cooled to obtain a good plasma outflow from space 46. Thus, for this purpose, cooling takes place with water at a temperature below 10° C. and preferably below 8° C., whilst the dimensions of chamber 56 are sufficiently small to ensure that the water can flow rapidly around the anode and discharge the calories produced with maximum efficiency.

Figure 3:
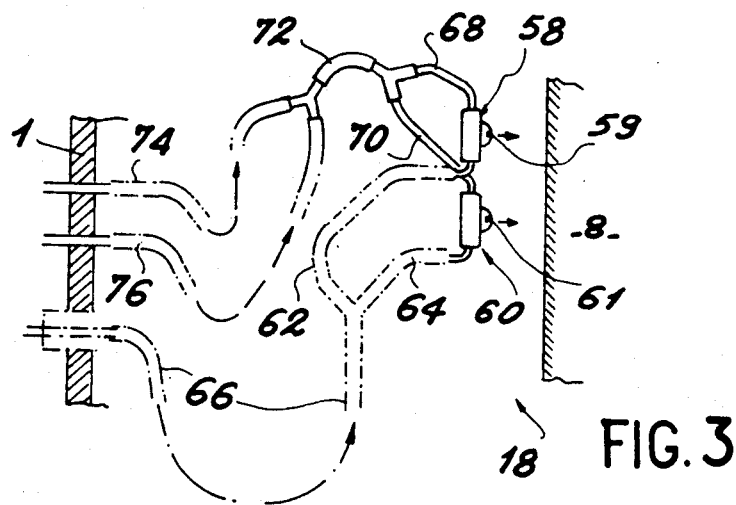
FIG. 3 a diagrammatic view of the cooling system used in the invention.

FIG. 3 shows the cooling system 18 used for maintaining a very low temperature level of the part in an area where the surface treatment takes place. The drawing shows two nozzles 58, 60 with orifices 59, 61, which serve for the discharge of the liquefied gas droplets. Nozzles 58, 60 are connected by two pipes 62, 64 to a common pipe 66, which links them with a liquefied gas, e.g. liquid argon tank or reservoir positioned within the enclosure and not shown in the drawing.

In order to bring about the formation of droplets it is necessary to entrain the liquefied gas with the aid of another pressurized gas, called the carrier gas. The carrier gas can optionally be mixed with another gas for regulating the surface tension of the liquefied gas droplets and for obtaining a better cooling, when the latter are deposited on the part 8. It can be seen that nozzles 58 and 60 are collected by pipes 68 and 70, respectively to a pipe 72 permitting the passage of the mixture of the carrier gases. Thus, it is possible to provide e.g. an argon tank and a gaseous helium tank outside enclosure 1 and connected to pipe 72 by pipes 74 and 76 respectively.

It is necessary to carefully check the pressure and flow rate of the liquefied gas and the carrier gas, so that the cooling takes place under optimum conditions. The best results are obtained when the liquefied gas droplets are spherical and have a diameter equal to or less than 40 microns. Moreover, to ensure that these droplets are not reheated on contact with one of the gases present in the enclosure and do not react therewith, the passage or travel distance must be sufficiently small. The distance between the outlet orifice 59 of nozzle 58 and part 8 must be constant and between 5 and 100 mm, preferably between 5 and 50 mm. The arrangement of the apparatus is such that the distance does not vary when the cooling system moves with respect to part 8. Finally, the liquefied gas must be in monophase form when it enters the nozzle, i.e. it must not be mixed with its vapour. This result is obtained by an appropriate choice of dimensions of the liquefied gas pipe. In the special case described here, pipes such as 62, 64 and 66 are double envelope pipes, i.e. are formed by two concentric pipes between which a vacuum is formed, in order to ensure a good insulation. If the liquefied gas pressure is between 0.1 to 0.15 MPa, the distance travelled by the liquid between the tank and the nozzle must be less than 5 meters and the passage diameter less than 12 mm.

In the present embodiment, the plasma surface treatment of the epoxy resin part, reinforced by glass fibres is performed under the following conditions:
 argon - nitrogen mixture supply: 6 liters of argon under a pressure of 0.2 MPa for 1.5 to 2 liters of nitrogen under a pressure of 0.16 MPa;
 supply intensity of the arc produced between the anode 45 and the cathode 48: 700 to 740A;
 distance between gun 10 and part 8 : 115 mm;
 displacement speed of gun 10: 12 cm/min.

Following the plasma surface treatment, part 8 is immediately cooled by means of cooling system 18. Six complete cycles are then performed involving a surface treatment by means of the plasma gun carried out under the same conditions and followed by a cooling operation.

Following this treatment, a boron carbide covering is formed on the part by spraying using a plasma gun. This operation can be carried out in the installation shown in FIG. 1, provided that the powder distributor 16 illustrated in detail in FIG. 4 is associated with gun 10.

Figure 4:
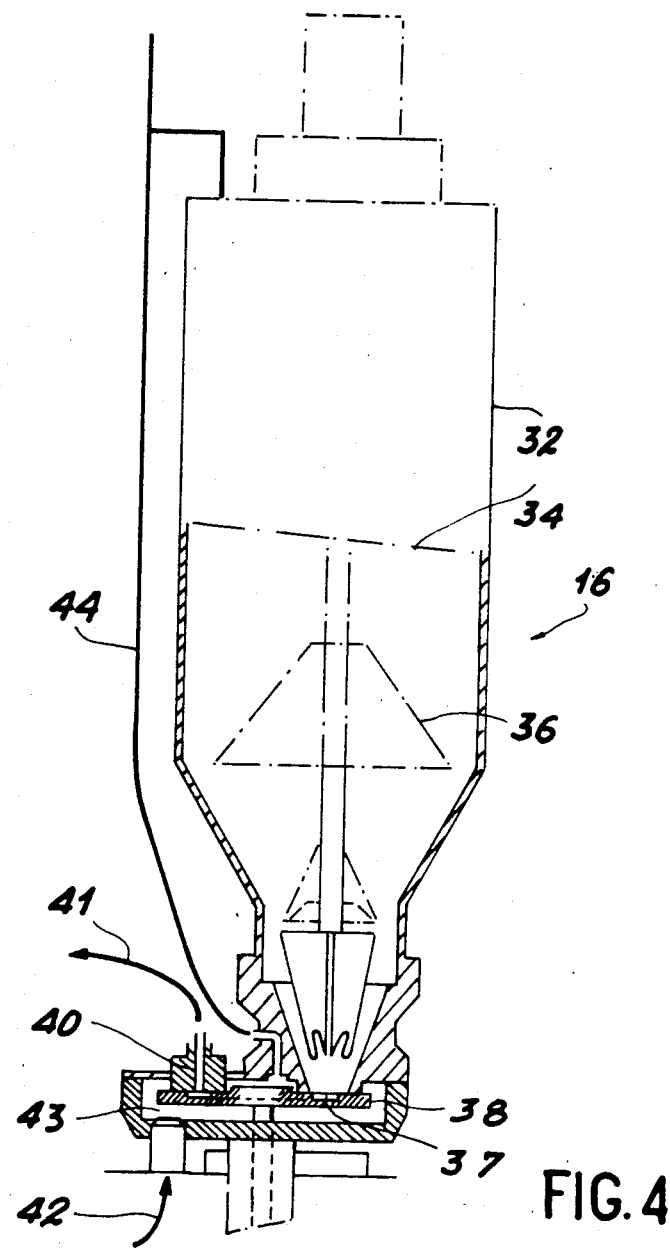
FIG. 4 a diagrammatic vertical sectional view of a powder distributor, which can be associated with the plasma gun for producing the covering of the part treated by the process according to the invention.

FIG. 4 shows that the powder distributor 16 essentially comprises a cylindrical container 32 in which is stored the powder mass 34, whilst a cone 36, whose axis coincides with that of container 32, permits a regular outflow of powder. The latter drops into the lower part of the apparatus into an annular slot 37 made on a rotatable plate 38, which moves it up to a coupling 40 permitting the connection of a pipe 41, whose other end is connected to gun 10. The movement of the powder is ensured by a gas, e.g. argon, which is supplied via a pipe 42 to a chamber 43 within which can rotate plate 38. The gas enters the slot 37, which ensures the movement or entrainment of the powder and its discharge by pipe 41. Finally, a duct 44 permits a gas circulation along container 32, which facilitates the circulation along container 32, which facilitates the discharge of the powder.

For the purposes of this operation, powder distributor 16 is filled with boron carbide powder and the argon is introduced into chamber 43 in order to move the powder into gun 10, which is also supplied with helium and argon. For bringing about the spraying or protection, the supply intensity of the arc produced by anode 45 and cathode 48 is 700 is A, the distance between the gun and the part is 80 mm and the translation displacement speed of the gun is 20 cm/min. Following the spraying operation, as herein before the coated part is immediately cooled. At the end of the operation, a 1 mm thick boron carbide covering is obtained.

This is followed by the resistance to removal in traction of the thus deposited boron carbide layer.

For comparison purposes, a 1 mm thick boron carbide covering was produced under the same conditions on epoxy resin parts reinforced with glass fibres, but which had not undergone the surface treatment according to the invention. The resistance to removal in traction of the thus deposited boron carbide coating is also measured. The following results were obtained with the parts treated according to the invention and those which were not treated:

|  | Removal resistance (in kg/cm$^2$) |
| --- | --- |
| Treated parts |  |
| Ex. 1 | 46.4 |
| Ex. 2 | 39.8 |
| Ex. 3 | 38.2 |
| Ex. 4 | 61.7 |
| Untreated parts |  |
| Ex. 1 | 7.5 |
| Ex. 2 | 6.2 |
| Ex. 3 | 5.4 |
| Ex. 4 | 7.0 |

Thus, the surface treatment according to the invention makes it possible to considerably increase the adhesion of the boron carbide covering.

In the same way, for a 0.2 mm thick aluminium deposit at 600 A, the following results are obtained:

|  | Removal resistance (in kg/cm$^2$) |
| --- | --- |
| Treated Parts |  |
| Ex. 5 | 15.5 |
| Ex. 6 | 24.9 |
| Ex. 7 | 32.0 |
| Ex. 8 | 29.5 |
| Untreated parts |  |
| Ex. 5 | 7.5 |
| Ex. 6 | 8.2 |
| Ex. 7 | 7.7 |
| Ex. 8 | 5.6 |

What is claimed is:

1. A process for the surface treatment of a part wherein it comprises subjecting the surface of said part in an inert atmosphere to the action of a hot gaseous arc plasma, and followed by the immediate cooling of the thus treated surface by projecting on to the same a cooling liquid at a temperature close to its saturation point which is a temperature whose variation from the saturation temperature does not exceed 15°C.

2. A process according to claim 1, wherein the gas of the plasma is nitrogen, argon, hydrogen, helium or a mixture thereof.

3. A process according to either of the claims 1 and 2, wherein the plasma comprises a reactive gas.

4. A process according to claim 3, wherein the reactive gas is water vapour or $BCl_3$.

5. A process for the preparation of a part coated by the hot spraying of a coating material, wherein on to the surface of the part to be coated is firstly deposited a thermoplastic material layer, wherein the thus deposited thermoplastic material layer then undergoes a surface treatment by performing the process according to one of the claims 1 to 4, wherein the coating material is then sprayed hot on to the surface of the part provided with the thus treated layer, wherein the surface of the thus treated part is then immediately cooled.

6. Process according to claim 5, wherein the surface of the thus treated part is cooled by spraying on to it a cooling liquid at a temperature close to its saturation point.

7. A process according to claim 5, wherein the thermoplastic material layer has a thickness of 20 to 500 μm.

8. A process according to claim 5, wherein the thermoplastic material is chosen from the group including polystyrene, polycarbonates, polyethers and polyolefins.

9. A process according to either one of the claims 1 to 5, wherein the part is a composite material.

10. A process according to claim 9, wherein the composite material is a plastic material reinforced by inorganic fibres.

11. A process according to claim 10, wherein the inorganic fibres, are glass, carbon, silica or graphite fibres.

12. A process according to claim 9, wherein the composite material is an epoxy resin reinforced by glass fibres.

13. Process according to claim 5, wherein the coating material is a refractory material chosen from among the oxides, carbides, silicides, nitrides and borides.

14. A process according to claim 5, wherein the thermoplastic material layer is deposited by spraying on to the surface of the part a solution of the thermoplastic material in a solvent and by then drying the thus deposited layer to eliminate the solvent.

15. A process according to either one of the claims 1 and 6, wherein the cooling liquid is a liquefied gas.

16. A process according to claim 15, wherein the liquefied gas is chosen from the group including nitrogen and argon.

17. A process according to either one of the claims 1 and 6, wherein the cooling liquid is sprayed in and droplet form by means of a carrier gas.

18. A process according to either one of the claims 1 and 5, wherein the part undergoes a cleaning treatment before subjecting it to the action of the gaseous arc plasma.

19. A process according to claim 18, wherein the cleaning treatment comprises degreasing and/or sand blasting.

20. A process according to claim 19, wherein degreasing is performed by means of an alcohol.

21. A process according to claim 19, wherein sand blasting is carried out by projecting corundum particles on to the part.

22. A process according to either one of the claims 1 and 5, wherein the gaseous plasma is a plasma of argon and nitrogen.

23. A process for the coating of a composite material part with a ceramic material wherein it consists of subjecting the surface of the part to a surface treatment process according to any one of the claims 1 to 4, and then spraying on to the same a ceramic material.

* * * * *